United States Patent
Kapoor et al.

(10) Patent No.: US 7,249,308 B2
(45) Date of Patent: Jul. 24, 2007

(54) ALGORITHM TO TEST LPAR I/O SUBSYSTEM'S ADHERENCE TO LPAR I/O FIREWALLS

(75) Inventors: Shakti Kapoor, Austin, TX (US); Daljeet Maini, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 434 days.

(21) Appl. No.: 10/422,652

(22) Filed: Apr. 21, 2003

(65) Prior Publication Data
US 2004/0210817 A1    Oct. 21, 2004

(51) Int. Cl.
*G11C 29/00* (2006.01)

(52) U.S. Cl. .............. 714/763; 714/718; 714/724; 714/763

(58) Field of Classification Search ........... 714/763, 714/718, 50, 42, 25, 719; 711/164; 710/113; 713/323
See application file for complete search history.

(56) References Cited

U.S. PATENT DOCUMENTS

| | | | | |
|---|---|---|---|---|
| 5,333,274 A | * | 7/1994 | Amini et al. | 714/50 |
| 5,423,029 A | * | 6/1995 | Schieve | 714/42 |
| 5,524,208 A | * | 6/1996 | Finch et al. | 714/25 |
| 5,668,815 A | * | 9/1997 | Gittinger et al. | 714/719 |
| 5,715,464 A | * | 2/1998 | Crump et al. | 713/323 |
| 5,754,821 A | * | 5/1998 | Cripe et al. | 711/164 |
| 5,923,859 A | * | 7/1999 | Melo et al. | 710/113 |

FOREIGN PATENT DOCUMENTS

JP    2003-058383    2/2003

* cited by examiner

*Primary Examiner*—Guy Lamarre
*Assistant Examiner*—Fritz Alphonse
(74) *Attorney, Agent, or Firm*—Duke W. Yee; Diana R. Gerhardt; Theodore D. Fay, III (57) ABSTRACT

A system for testing logical partitioning. In a preferred embodiment, an I/O adapter is configured to break partitioning rules, for example, to attempt to access addresses outside a valid address range. Software is used to check for expected errors at expected addresses. If expected errors are not found, a fault in the partitioning I/O subsystem is indicated.

28 Claims, 5 Drawing Sheets

ALGORITHM TO TEST LPAR I/O SUBSYSTEM'S ADHERENCE TO LPAR I/O FIREWALLS

BACKGROUND OF THE INVENTION

1. Technical Field

The present invention relates generally to logical partitioning, and more particularly to testing of partitioning I/O subsystem adherence to proper logical partitioning I/I rules.

2. Description of Related Art

Logical partitioning is a system of taking a computer's total resources—processors, memory and storage—and splitting them into smaller units that each can be run with its own instance of the operating system and applications. Logical partitioning, which requires specialized hardware circuits, is typically used to separate different functions of a system, such as Web serving, database functions, client/server actions or systems that serve multiple time zones and/or languages. Logical partitioning can also be used to keep testing environments separated from the production environments. Since the partitions in effect act as separate physical machines, they can communicate with each other.

Some systems (IBM systems, for example) use firewalls that support logical partitioning. In a partitioned system, there are rules that must be followed by all I/O (input/output) operations from the I/O adapter. These rules include: (1) I/O adapters should be able to do DMA (Direct Memory Access) to all the system memory regions allocated to the partition to which they are assigned; (2) I/O adapters should not be able to do DMA to those system memory areas that do not belong to the partition to which they are assigned; (3) Each I/O adapter's parent (either PCI-to-PCI bridge (PPB) or PCI-to-Host bridge (PHB)) must contain the 'ibm,dma-window' property. The I/O adapter can throw only those bus addresses on the bus that lie in the address range as defined in the 'ibm, dam-window' property of its parent; and (4) I/O adapters cannot use Dual Address Cycle (DAC).

LPAR (logical partition) I/O subsystems should adhere to the LPAR I/O rules. There often arise situations where these rules may not be followed, due to software or hardware problems. Misbehavior in one partition can lead to a crash in other partitions. Therefore, there is a need in the art for means to test firewalls between partitions.

SUMMARY OF THE INVENTION

The present invention describes algorithms to cause situations where partitioning rules are not followed, and enables testing of the firewall between partitions.

In a first preferred embodiment, a PCI (Peripheral Connect Interface) card is used to throw addresses on the bus which lie outside the valid address range for that card. After an invalid address is thrown, software compares the last address thrown to the first address thrown. If the two addresses do not match, unexpected I/O behavior is indicated and a DMA error is reported.

In a second preferred embodiment, a PCT card attempts to do DMA such that the DMA starts with valid addresses, but crosses over into an invalid range of addresses. Again, after an invalid address is thrown, software compares the last PCI address thrown with the first invalid address thrown. If they do not match, unexpected I/O behavior is indicated and an error is reported.

In a third preferred embodiment, PCI cards which support DAC are used to check whether the firewall mechanism to block DAC in a LPAR system is working. For example, a PCI card is programmed to issue DAC during DMA operations. The card should get a master abort on the very first DMA transaction if DMA is triggered with DAC enabled. Software compares the first address thrown by the card with the address on which it got an abort. If they are not the same, abnormal I/O behavior is indicated and a potential error is reported.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
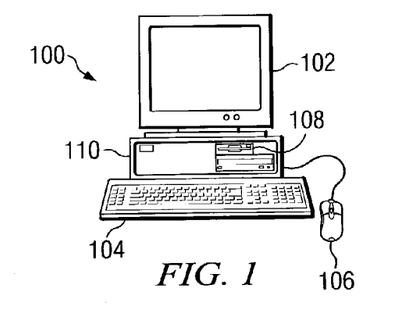
FIG. 1 shows a computer system consistent with implementation of a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes a system unit 110, a video display terminal 102, a keyboard 104, storage devices 108, which may include floppy drives and other types of permanent and removable storage media, and mouse 106. Additional input devices may be included with personal computer 100, such as, for example, a joystick, touchpad, touch screen, trackball, microphone, and the like. Computer 100 can be implemented using any suitable computer, such as an IBM RS/6000 computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface that may be implemented by means of systems software residing in computer readable media in operation within computer 100.

Figure 2:
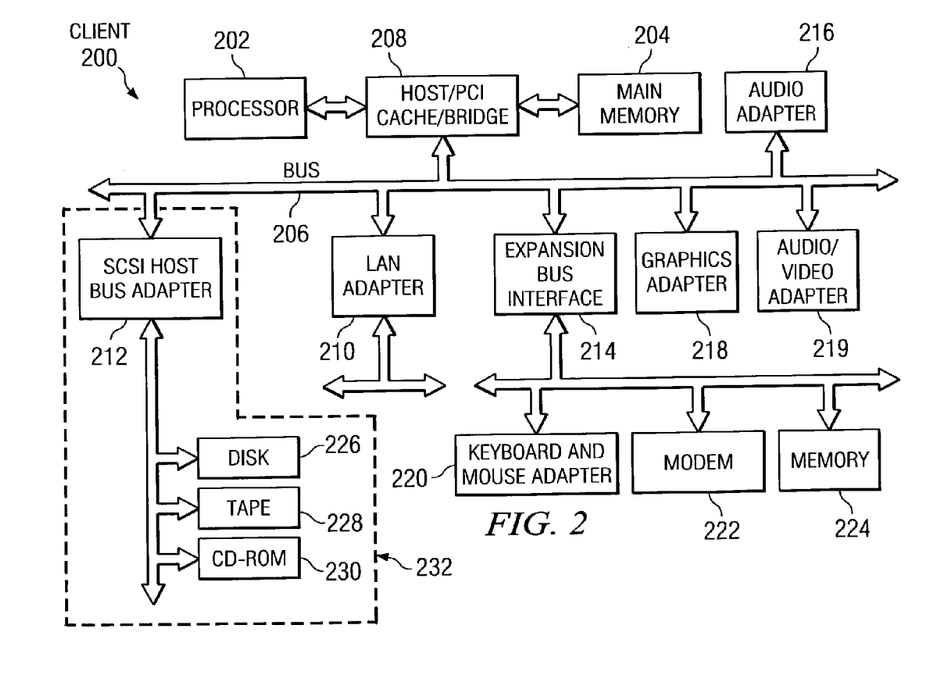
FIG. 2 shows a block diagram of various subsystems of a computer system consistent with implementation of a preferred embodiment.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows 2000, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230, as noted by dotted line 232 in FIG. 2 denoting optional inclusion. In that case, the computer, to be properly called a client computer, must include some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance. The processes of the present invention are performed by processor 202 using computer implemented instructions, which may be located in a memory such as, for example, main memory 204, memory 224, or in one or more peripheral devices 226-230.

Testing of LPAR subsystems for adherence to the LPAR I/O rules is preferably done using an I/O adapter. In an example embodiment, these rules are enforced in two ways.

First, restriction of access to system memory rules is done through PCI-to-Host bridge's translation mechanism. This is discussed in more detail below. Second, bus addresses thrown by an I/O adapter are restricted. This is done by PHB or PPB chips. A preferred embodiment of the present invention tests this hardware property.

An I/O adapter can be configured through software in such a way so that the various LPAR rules for the I/O adapter are not followed. In a preferred embodiment, software checks for the expected errors to occur at the expected addresses. Three example algorithms for accomplishing these tests under different circumstances are described below.

In a preferred embodiment, a valid address bus range for the adapter is identified. Software is made aware of the valid address range for the I/O adapter so that errors can later be detected during testing. For example, in an IBM system, valid bus address ranges are found from the 'ibm,dma-window' property of the parent of the I/O adapter. The parent can be the PCI-to-PCI bridge or the PCI-to-Host bridge of the I/O adapter. To extract the 'ibm,dma-window' property of the parent, either the device tree interfaces (in test cases that are run under Aix) or ROS interfaces (when test cases are to be run under TnK) can be used.

Operating systems like AIX, Linux, or TnK provide interfaces to the user applications to query the system information through operating system specific libraries. These calls can be used to extract the 'ibm,dma-window' property of the device's parent which can be a PCI-PCI bridge of the host-PCI bridge.

These interfaces provide APIs (Application Program Interfaces) that help traversing all the devices present in the system. These interfaces also provide APIs that help in searching for a particular class of devices, finding out a particular property of a PCI device, etc.

Figure 3:
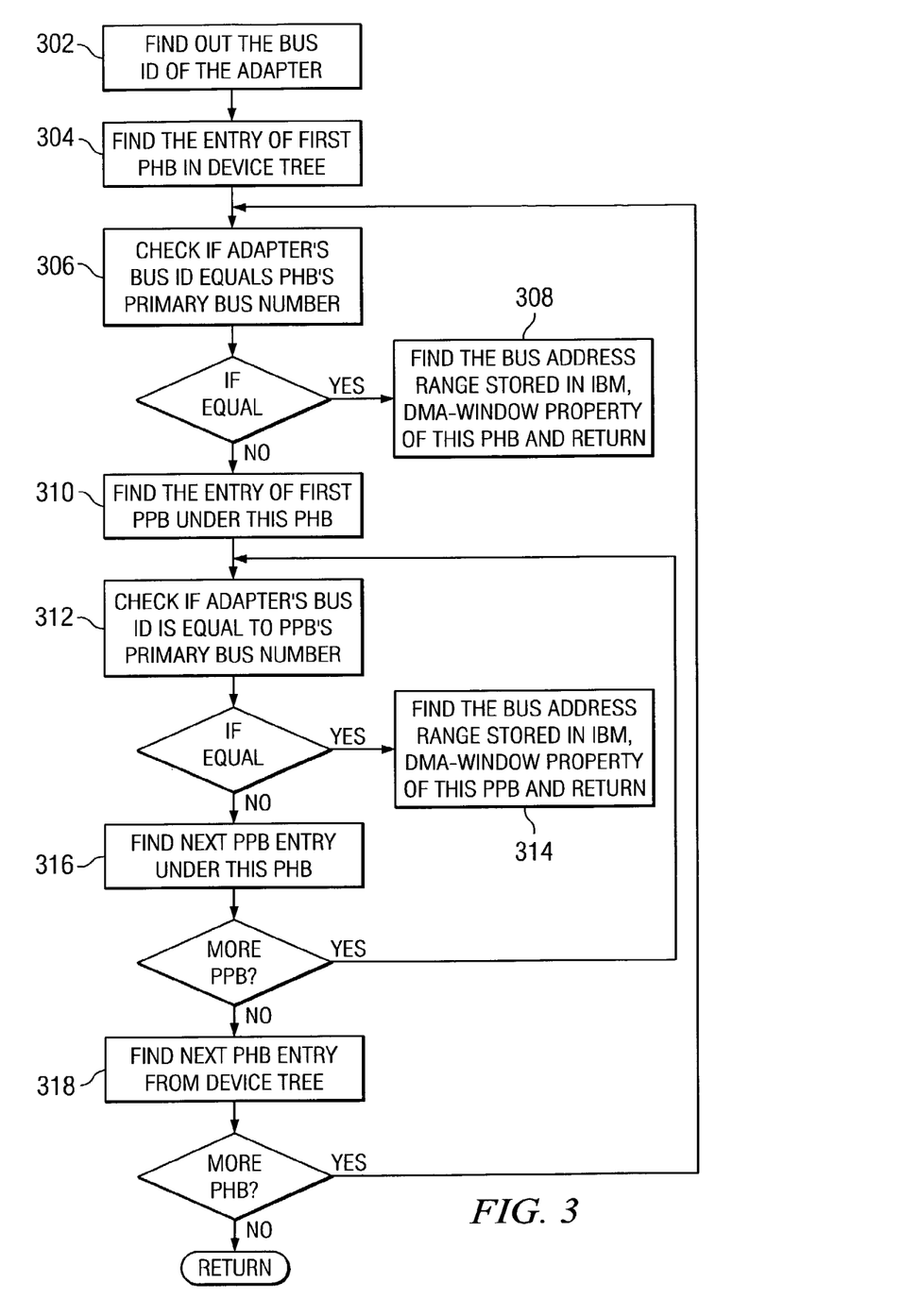
FIG. 3 shows a process flow consistent with a preferred embodiment for detecting a valid bus range for an adapter.

An example preferred process flow for detecting the valid bus range for the adapter is shown in FIG. 3. In general, the process checks a PHB entry in the device tree to see if that is the parent of the I/O adapter. If it is, its 'ibm,dma-window' property is extracted. Otherwise, the same check is done for all PPB children of the PHB. If the parent is not found among the PPB children of the PHB, the next PHB entry in the device tree is taken and all steps are repeated until a parent is found and a valid bus address range is obtained.

The process starts by identifying the bus ID of the adapter (step 302), followed by finding the entry of the first PHB in the device tree (step 304). Next, the adapter's bus ID is checked to see if it equals the PHB's primary bus number (step 306). If it does, then the bus address range stored in the ibm,dma-window property of the PHB is found and returned (step 308). If not, then the entry of the first PPB under that PHB is found (step 310). Next, the adapter's bus ID is checked to see if it is equal to the PPB's primary bus number (step 312). If so, then the bus address range stored in ibm,dma-window property of that PPB is found and returned (step 314). If not, the next PPB entry under that PHB is found (step 316). If there are more PPBs under that PHB, then the process returns to step 312 and continues with the next PPB. If not, then the next PHB entry from the device tree is found (step 318). If such exist, then the process returns to step 306 and continues using the next PHB. If there are no more PHBs, then the process returns.

Once the valid bus address range is known, a PCI card can be used to throw invalid addresses on the bus on its DMA transactions. Software can then check for expected errors at expected addresses.

Figure 4:
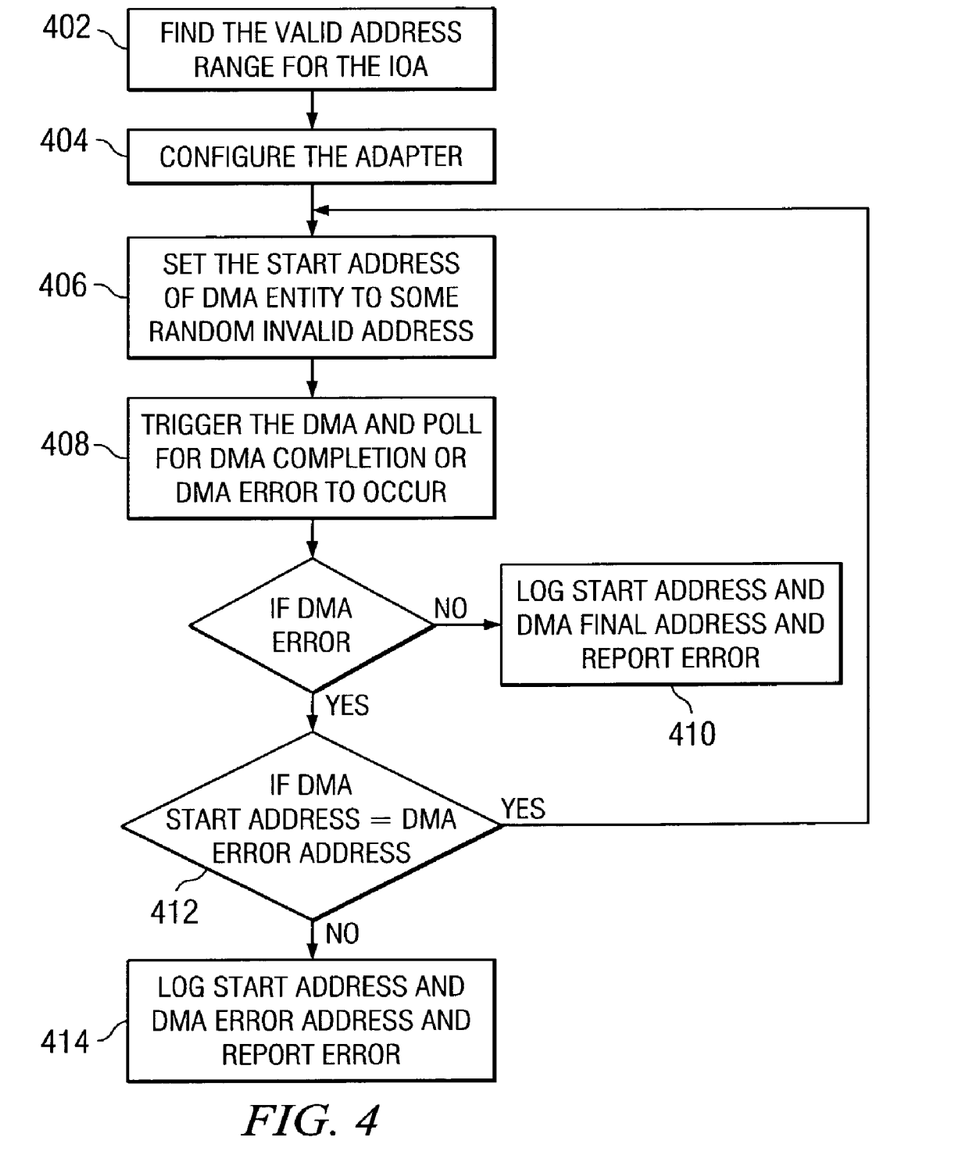
FIG. 4 shows an example of testing for errors when a PCI card throws an invalid address on its first DMA transaction, consistent with a preferred embodiment.

FIG. 4 shows an example of testing for errors when the PCI card throws an invalid address on its first DMA transaction. In this example, using the ROS interfaces or device tree interfaces, the PCI address range which the card can throw on the PCI bus while acting as bus master is found. The card should be properly initialized for DMA. The card's DMA entity will be set up such that it throws the PCI addresses on the bus which do not fall in the valid address range for that card. The card should get a 'target-abort' on the very first DMA transaction, since the first thrown address should be outside the valid address range. After the DMA completes or some error is encountered during DMA, software will compare the last bus address thrown by the card with the very first address thrown by the card. If the last address thrown is not the same as the first address thrown, this indicates unexpected I/O behavior and a potential hole in the firewall. Such behavior might owe to a malfunctioning I/O card or some malfunction in the bridge chip, for example.

The process begins by finding a valid address range for the I/O adapter (step 402). This step can, for example, be accomplished according to the example process flow of FIG. 3. Next, the adapter is configured (step 404), and the start address of the DMA entity is set to some random invalid address (step 406). DMA is triggered and polled for DMA completion or DMA error (step 408). If there is no DMA error, this indicates that unexpected I/O behavior has occurred, and the start address is logged and the DMA final address and error are reported (step 410). If a DMA error is detected, then the DMA start address is compared to the DMA error address (step 412). If the two are not equal, the start address and DMA error address are logged and an error reported (step 414). If the DMA start address and DMA error address are equal, then the process returns to step 406 and repeats from there to continue testing.

A PCI card can also be used as a vehicle to trigger DMA operations such that they cross the valid bus address range while doing the DMA transactions. This case tries to do DMA such that DMA starts with valid addresses and then crosses over to an invalid address range.

Briefly described, the test case uses the ROS interface or device tree interface to find out the PCI address range which the card can throw on the PCI bus while acting as PCI bus master. The card is preferably properly initialized for DMA. The card's DMA entity will be set up such that the start bus address for every DMA operation is valid, but it lies close to the valid address range boundary. The size for each DMA operation is set such that while doing each DMA operation, it crosses the valid address range boundary and into the invalid address range. The card should get a 'target-abort' on the PCI transaction which throws the invalid address. Software will know the very first address on which the card should get the abort, based on where the valid address range ends. After the DMA operation is over (i.e., after an invalid address is thrown), software compares the last PCI address thrown by the card. If that address is not the expected address, abnormal behavior by the I/O is indicated, and there is potentially a hole in the firewall designed to protect one partition from another. Such a hole can be caused by a misbehaved I/O card or some malfunction in the bridge chips, for example.

Figure 5:
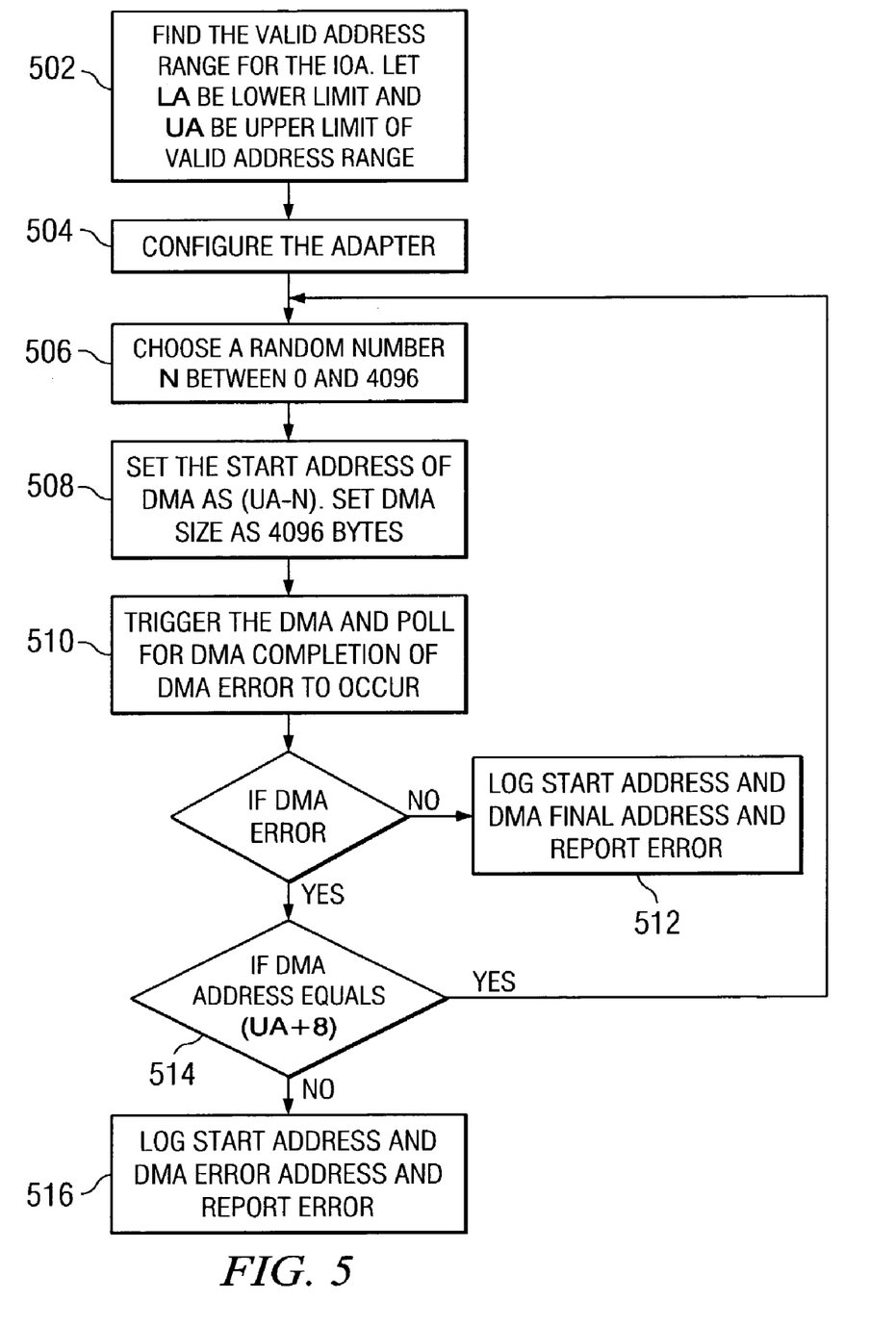
FIG. 5 shows an example of testing for errors when a PCI card begins transacting in a valid address range but crosses over to an invalid range, consistent with a preferred embodiment.

An example implementation is shown in FIG. 5. The process starts by finding the valid address range for the I/O adapter, as discussed above (step 502). The lower address limit is labeled LA while the upper limit is labeled UA in this example, for purposes of discussion. The adapter is configured for DMA (step 504) and a random number N is chosen between 0 and 4096 (in this example) (step 506). Next, the start address of the DMA is set at (UA−N), and DMA size is set as 4096 bytes (step 508). The DMA is triggered and polled for completion or DMA error (step 510). If no error is detected, the start address and DMA final addresses are logged and an error is reported (step 512). If there is an error, then the error address is checked to see if it equals (UA+8) (step 514). If it does not, then the start address and DMA final addresses are logged and an error is reported (step 516). If the error address does equal (UA+8), then the process reverts back to step 506 and continues again.

Note that in this example, the first address which should generate an error condition in the adapter will be UA+8 on the 64 bit PCI bus implementations. Since IBM machines that support logical partitioning have mostly 64 bit PCI buses and most of the I/O adapters use the 64 bit addressing mode, UA+8 is the first address that should generate the error condition in the card.

In another embodiment, a PCI card which supports DAC is used to check whether the firewall mechanism properly blocks DAC in a LPAR system. DAC is not allowed as part of the enablement of the firewall to protect one partition against an errant partition in a LPAR system. In a LPAR system, restriction to access of the system memory areas through DMA is done though the translation mechanism (used for bus address to system memory address translation). In the translation mechanism entity only those system memory addresses are permitted that are accessible for that partition. When DAC is used by I/O adapters (for example, in IBM type systems), the translation mechanism used by the PCI host bridges is not used. If hardware allows I/O adapters to use DAC for DMA in LPAR mode, DMA will bypass the translation mechanism. In that case, erroneous programming/setting of software and/or hardware can result in access to other partition system memory. This is a violation of LPAR I/O guidelines and therefore DAC is not allowed by hardware under LPAR mode.

To test whether such a violation may occur, a PCI card can be programmed to issue DAC during DMA operations. The card should get a master abort on the very first DMA transaction if the DMA is triggered with DAC enabled. Software can compare the first address thrown by the card with the address on which it got the abort message. If these addresses are not the same, it indicates abnormal I/O behavior and potentially a hole in the firewall between partitions.

Figure 6:
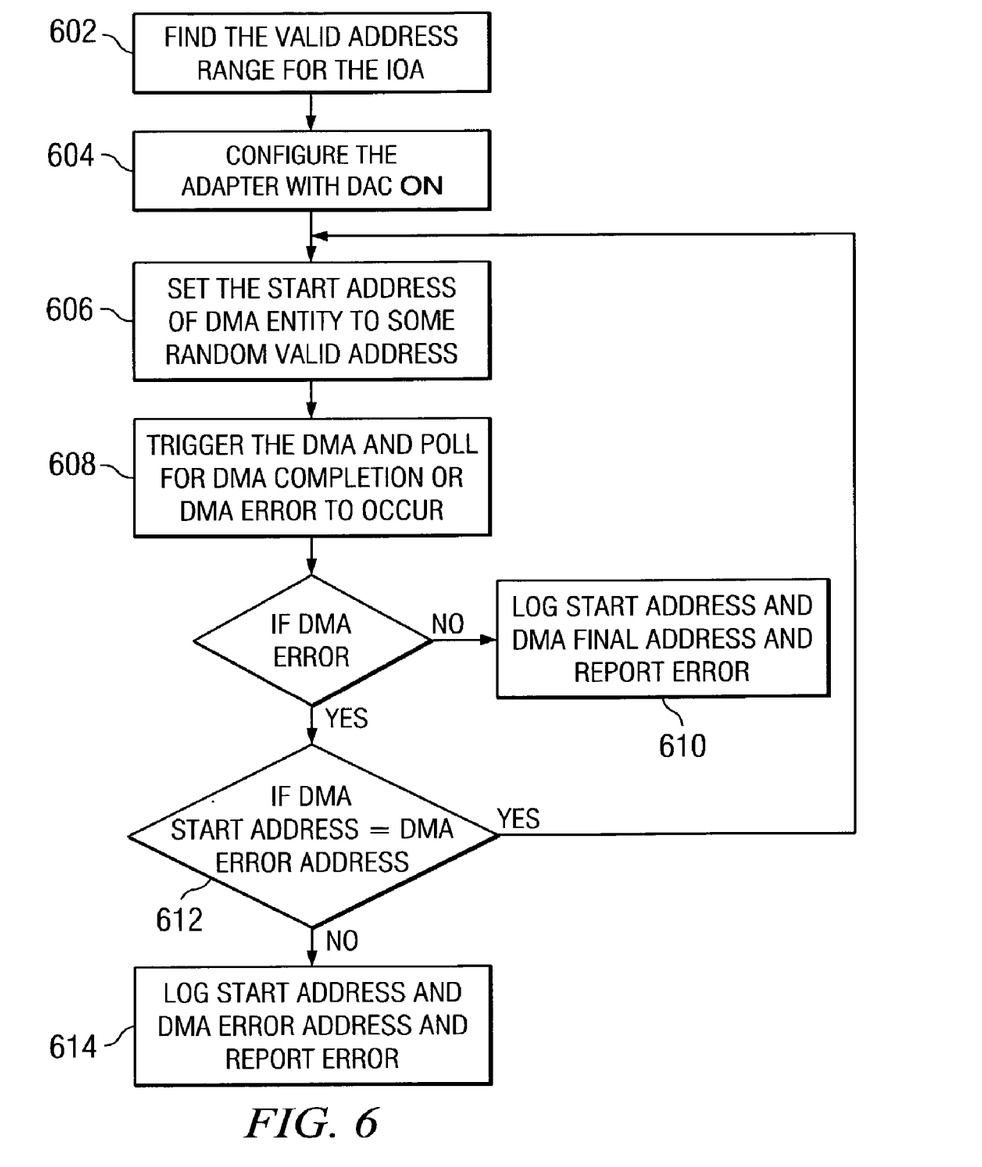
FIG. 6 shows an example process for testing whether firewall mechanisms properly block DAC in a logical partition system, consistent with a preferred embodiment.

An example preferred embodiment of this situation is presented in FIG. 6. First, the valid address range for the I/O adapter is found (step 602). Next, the adapter is configured with DAC on (step 604). The start address of the DMA entity is set to some random valid address (step 606) and the DMA is triggered and polled for DMA completion or DMA error (step 608). If no error is detected, the start address and DMA final address are logged and an error is reported (step 610). If a DMA error is detected, the DMA start address is compared to the DMA error address (step 612). If they are not the same, the start address and DMA error address are logged and an error is reported (step 614). If the DMA start address is the same as the DMA error address, then the process returns to step 606 and continues.

Though the innovative concepts of the present invention are described with reference to particular examples, the invention is not meant to be limited to those examples, as will be evident to one of ordinary skill in the art.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of testing direct memory access (DMA) in a logical partition system, comprising the steps of:
   configuring an I/O adapter to disobey one or more logical partition rules; and
   checking for expected errors at expected addresses, wherein the expected errors occur as a result of configuring the I/O adapter to disobey the one or more logical partition rules.

2. The method of claim 1, wherein if expected errors do not occur at expected addresses, a DMA error is reported.

3. The method of claim 1, wherein the expected errors are DMA errors caused by attempting to access an address outside a valid address range for the I/O adapter.

4. A method of finding a valid address range for an input/output (I/O) adapter in a computer system, comprising the steps of:
   (a) identifying a bus identification of the I/O adapter;
   (b) comparing the bus identification of the I/O adapter to a bus identification for a first PCI-to-host bridge in a device tree of the computer system;
   (c) if the comparing step of (b) determines that the first PCI-to-host bridge is not a parent of the I/O adapter, comparing the bus identification of the I/O adapter to bus identifications of PCI-to-PCI bridges that are children of the first PCI-to-host bridge to find a parent of the I/O adapter;
   (d) if the comparing step of (c) determines that none of the PCI-to-PCI bridges that are children of the first PCI-to-host bridge are parents of the I/O adapter, then repeating steps (b) and (c) for a second PCI-to-host bridge; and
   (e) when the parent of the I/O adapter is found, identifying the valid address range for the I/O adapter from a property of the parent.

5. The method of claim 4, wherein the property of the parent is an ibm,dma-window property.

6. The method of claim 4, wherein the I/O adapter is an adapter for a PCI card.

7. A method of testing direct memory access (DMA) rules of a logical partition system, comprising the steps of:
   determining a valid address range for an input/output (I/O) adapter;
   attempting to access one or more addresses outside the valid address range with DMA, starting with a first address;
   if no DMA error occurs, logging the first address and reporting an error;
   if a DMA error occurs, comparing the first address to the DMA error address; and
   if the first address is not equal to the DMA error address, logging the first address and reporting an error.

8. The method of claim 7, wherein the I/O adapter is configured to throw an address outside the valid address range by configuring a DMA entity of the I/O adapter.

9. The method of claim 7, wherein the I/O adapter is an adapter for a PCI card.

10. The method of claim 7, further comprising the step of: if no DMA error occurs, logging the first address and a DMA final address and reporting an error, wherein the DMA final address is the last address accessed using DMA.

11. A method of testing direct memory access (DMA) rules of a logical partition system, comprising the steps of:
    determining a valid address range for an input/output (I/O) adapter;
    configuring a DMA entity of the I/O adapter to throw one or more addresses outside the valid address range starting with a first address;
    after DMA is complete or an error occurs, comparing a last address thrown by the I/O adapter with the first address thrown by the I/O adapter; and
    if the last address is not the first address, reporting an error.

12. The method of claim 11, further comprising the steps of: if no DMA error occurs, logging the first address and the last address and reporting an error.

13. The method of claim 11, wherein the I/O adapter is an adapter for a PCI card.

14. A method of testing direct memory access (DMA) rules of a logical partition system, comprising the steps of:
    determining a valid address range for an input/output (I/O) adapter;
    setting a size for a DMA operation such that the operation crosses the valid address range boundary into an invalid address range;
    detecting a first address on which a DMA error occurs during the DMA operation; and
    comparing the first address on which the DMA error occurs to a last address to which access is attempted.

15. The method of claim 14, further comprising the step of: if the first address on which a DMA error occurs and the last address to which access is attempted are not the same, reporting an error.

16. A method of testing rules of a logical partition system, comprising the steps of:
    configuring an input/output (I/O) adapter with dual address cycle (DAC) on;
    triggering a direct memory access (DMA) operation for a valid address; and
    comparing the valid address with a DMA error address.

17. The method of claim 16, wherein if the valid address and the DMA error address are not the same, reporting an error.

18. The method of claim 16, wherein if a DMA error does not occur, reporting an error.

19. A system for testing direct memory access (DMA) in a logical partition system, comprising:

an I/O adapter configured to disobey one or more logical partition rules; and an algorithm that checks for expected errors at expected addresses as a result of configuring the I/O adapter to disobey the one or more logical partition rules.

20. The system of claim 19, wherein if expected errors do not occur at expected addresses, a DMA error is reported.

21. The system of claim 19, wherein the expected errors are DMA errors caused by attempting to access an address outside a valid address range for the I/O adapter.

22. A computer program product for testing direct memory access (DMA) rules of a logical partition system, comprising the computer implemented steps of:

first instructions for determining a valid address range for an input/output (I/O) adapter;

second instructions for attempting to access one or more addresses outside the valid address range with DMA, starting with a first address;

third instructions for, if no DMA error occurs, logging the first address and reporting an error;

fourth instructions for, if a DMA error occurs, comparing the first address to the DMA error address; and fifth instructions for, if the first address is not equal to the DMA error address, logging the first address and reporting an error.

23. The product of claim 22, wherein the I/O adapter is configured to throw an address outside the valid address range by configuring a DMA entity of the I/O adapter.

24. The product of claim 22 wherein the I/O adapter is an adapter for a PCI card.

25. The product of claim 22, further comprising the step of: if no DMA error occurs, logging the first address and a DMA final address and reporting an error, wherein the DMA final address is the last address accessed using DMA.

26. A system for testing direct memory access (DMA) rules of a logical partition system, comprising:

means for determining a valid address range for an input/output (I/O) adapter;

means for configuring a DMA entity of the I/O adapter to throw one or more addresses outside the valid address range starting with a first address;

after DMA is complete or an error occurs, means for comparing a last address thrown by the I/O adapter with the first address thrown by the I/O adapter; and if the last address is not the first address, means for reporting an error.

27. The system of claim 26, further comprising: if no DMA error occurs, means for logging the first address and the last address and reporting an error.

28. The system of claim 26, wherein the I/O adapter is an adapter for a PCI card.

* * * * *